United States Patent Office 3,840,652
Patented Oct. 8, 1974

3,840,652
METHOD OF REMOVING FOREIGN PHASES FROM THE CRYSTALS OF A COMPOUND
Wouter Albers, Emmasingel, Eindhoven, Netherlands, assignor to U.S. Philips Corporation, New York, N.Y.
Continuation of application Ser. No. 773,641, Nov. 5, 1968, which is a continuation-in-part of application Ser. No. 527,166, Feb. 14, 1966, both now abandoned. This application May 21, 1971, Ser. No. 145,876
Claims priority, application Netherlands, Feb. 27, 1965, 6502529
Int. Cl. C01b 19/00, 25/00
U.S. Cl. 423—509
3 Claims

ABSTRACT OF THE DISCLOSURE

Method of purifying a crystal of a compound in which the crystal to be purified is heated in a condenser along with a mixture of a crystal compound together with a liquid or solid phase of one or more of the components of the compound. The procedure, if necessary, is repeated with a mixture having a composition opposite that previously used in regard to the phase diagram of the compound until the physically pure crystal is obtained.

---

This application is a continuation of application Ser. No. 773,641, filed Nov. 5, 1968, and now abandoned, which is in turn a continuation-in-part of application Ser. No. 527,166, filed Feb. 14, 1966, and now abandoned.

The invention relates to the manufacture of physically pure crystals of a compound consisting of at least two components. Physically pure crystals are to be understood to mean herein crystals with a homogeneous composition and physical properties. The term "crystals" should be understood in a very wide sense and is not restricted to monocrystalline bodies but also comprises crystals in polycrystalline bodies, while the crystals may in addition have very small proportions, for example, in a powder. Crystals of compounds have already been prepared by many methods. A simple method is the heating of a mixture of the components. In many cases, for example, a mixture of the components may be fused during which the compound is formed or the compound may be formed from the melt on cooling. In this case the components may be fused in equivalent quantities but it is alternatively possible to use an excess of one of the components, the crystals of the compound formed being separated afterwards from the excessive component. In addition, the compound can be synthesized directly by reaction from the evaporated components. Crystals of such compounds often were not homogeneous and the physical properties, in as far as they are sensitive to deviations in the stoichiometric composition, in general could be obtained in a reproducible manner with difficulty only or not at all. Since a homogeneous product was to be expected, often crystals were found to have formed having parts of mutually different physical properties. A treatment has already been proposed to homogenize such crystals of compounds consisting of two components by heating such a crystal in a closed container, the said container being heated to a given temperature, the container also containing a mixture of the relative compound and another phase which was in equilibrium with this compound at that temperature and which was richer in one of the said components. This mixture produces vapor pressures of the components in the container which are in equilibrium with the crystalline phase of the compound which has the highest possible content of that component which is present in excess in the mixture in the second phase. By exchange with the ambient atmosphere and diffusion of the component in the crystal the whole crystal will obtain a homogeneous composition in the long run which has the highest possible concentration of the last mentioned component while the crystalline structure is maintained. It has now been found, however, that such a treatment often does not yet result in a crystal with invariable reproducible physical properties and it is one of the objects of the invention to improve this. The invention is based on the recognition of the fact that a crystal obtained in known manner of a compound consisting of several components may contain inclusions consisting of one or several other phases consisting of one or more components of the compound. These inclusions may have been formed during the preparation of the compound, for example, during the formation from a melt with the best possible stoichiometric composition, by errors in the quantities of the components used. When at least part of the said inclusions just contains that component in excess which also is present in excess in the mixture, such an inclusion will at most partially be converted in the compound but a part consisting of the second phase of the mixture will be retained as a result of which the crystal remains non-homogenous.

According to the invention, crystals of a compound of two or more components are purified from occlusions in the crystals consisting of other phases formed of one or more components of the compound by a method involving first placing the crystal to be purified in a closed container along with a mixture of a crystalline form of the compound together with a condensed phase (liquid or solid) of one or more components of the compound, the composition of the mixture lying on one side of the phase diagram of the compound. The mixture and crystal are placed in the container so that they are physically separate but sufficiently close to allow free diffusion of vapors between them. The closed container containing the crystal and mixture is then heated to a temperature sufficiently high to cause a vapor from the mixture to form and to diffuse into the crystal, the phase in the mixture (the crystalline form and condensed phases other than the crystalline form) are in equilibrium with each other at the temperature employed. The heating is continued until the crystal and mixture are in thermodynamic equilibrium with each other.

The procedure is then repeated this time employing a mixture of crystalline phase and condensed phase that lies on the opposite side of the phase diagram of the compound with respect to the composition of the mixture previously employed.

The ratio of the phases in the mixture employed in each case must be sufficiently large so that there is no disappearance of any of the phases of the mixture into the crystal or into the space in the container between the crystal and mixture. Other than that, the ratio of phases in the mixture is not critical. Preferably the total quantity of the mixture is large with respect to the quantity of crystals to be treated, as a result of which the quantities of the components necessary for building up the equilibrium composition in the intermediate space which is not occupied by the mixture and the crystals are substantially supplied by the mixture. Preferably the volume of the container is kept as small as possible in order that the intermediate space, which consequently is not occupied by the crystals or the mixture, be as small as possible so that the quantities of the components necessary for building up the equilibrium concentrations of those components in that space is as small as possible and that further the occurrence of temperature gradients in the container can be mitigated as much as possible.

The cooling after the thermal treatment is preferably carried out so that the formation of new inclusions is prevented as much as possible. Therefore, cooling to a temperature at which diffusion of the components in the crystal occurs is preferably effected so rapidly that the equilibrium condition of the treated crystals obtained at the temperature of treatment is maintained.

Alternatively, after a treatment at higher temperature the assembly may be stabilised at a lower temperature in which, of course, the composition is varied somewhat in general, after which the assembly is rapidly cooled. In this manner the possibility of renewed formation of inclusions can be reduced since the spontaneous formation of nuclei of inclusions is smaller at low temperature and the temperature can be reduced more quickly to a value at which diffusion of components substantially cannot occur any longer. In the case of crystals from two components two treatments are sufficient, first with a mixture which is richer in one of the two components and then with a mixture which is richer in the other component.

In the case of crystals with three or more components more than two treatments are necessary, in general.

Conditions for the possibility of treating crystalline compounds with the method according to the invention are that the compound is stable at temperatures at which diffusion of the components is possible and at which stable condensed phases, i.e. solid or liquid, from one or more of the components can exist which at that temperature can be in a thermodynamic equilibrium with the crystalline compound.

The phase system of the components can be investigated previously, if this system is not already known, and the required compositions of the mixtures can be determined therefrom.

Although it is possible that the composition of the crystals which is stable at the temperature of treatment might no longer be stable at low temperature, said composition can very readily remain at the said low temperature and a very long life can be obtained in this manner. When a crystal thus treated is used for electrical purposes—if it exhibits particular electric properties, for example, if it consists of a semiconductive compound—the properties will be maintained for a very long time in many cases since inclusions are not present. When such inclusions would be present, they could remove an excess of a component, if any, from the surrounding material, by absorption of the component as a result of which the composition of the crystal could vary very slowly and partly locally, in which also the electric properties of the crystal would vary. When such inclusions are not present said possibility is less great since in that case nuclei of inclusions have to be formed in the crystal which nuclei formation in general is more difficult than the growing of inclusions already present. In addition it is possible that a marginal composition which is stable at the temperature of treatment and which can be obtained with the above described method according to the invention, is stable at low temperature also but in the latter case no longer forms a marginal composition. Any inclusion which has a different composition and will only be in equilibrium with a marginal composition of the crystal would cause the surrounding material to vary in the direction of said marginal composition, when the crystal is frequently used for electrical purposes, or by other causes, for example, temperature fluctuations, and therewith also the physical properties thereof. In the absence of such inclusions the composition is maintained since the whole crystal in this composition is stable and internally has no contact with other phases with which said composition is not in equilibrium.

In general the total quantity of the material of the inclusions is extremely small as compared with the quantity of material in the crystal. Therefore, in the above described method one or more of the treatments may be carried out with a marginal composition of the compound only instead of with a mixture. In that case the resulting composition of the crystal after such a treatment may differ somewhat from the relative marginal composition but when a sufficient excess of the said marginal composition is used this difference will only be extremely small.

Although with the above described methods according to the invention crystals can be obtained which are free from inclusions, the said crystals are restricted to marginal compositions or nearly-marginal compositions in accordance with the temperature and composition of the mixture used in the last treatment. To obtain crystals also with different compositions, according to another aspect of the invention one or more crystals of the compound are arranged in a closed container with measured quantities of at least two different marginal compositions of the said compound and the assembly is heated at a temperature which is sufficiently high to enable diffusion of the components in the crystal treated and which is carried out for a period of time in which all the material has obtained a homogeneous composition.

The quantities of the marginal compositions are preferably chosen to be so that during the thermal treatment a composition is obtained which is stable at room temperature.

The starting substances are preferably prepared previously by using the above described method according to the first aspect of the invention to obtain marginal compositions which are free from inclusions. This is of particular importance also for the crystal to be treated when the compound has only a narrow range of existence as far as the possible variation of its composition is concerned. In the container may be included a few crystals to be treated together with a powdered mixture of the marginal compositions; alternatively, only the crystals to be treated may be included in which crystals of different marginal compositions are used in the correct ratio.

A further important advantage of the methods according to the invention is that an accurate knowledge of the range of existence of the compound in the phase diagram a priori is not required and said methods can also be used when this range of existence in the phase diagram is bounded very closely and as a result is difficult to determine accurately. In the method according to the first aspect of the invention a marginal composition is obtained in which the mixture last used determines which component or components will be present in (a) comparatively higher concentration(s).

For the method according to the second aspect of the invention, favourable ratios can be determined experimentally by using marginal compositions in various ratios and by measurements at the resulting crystals. Favourable temperatures and duration can also be experimented in which data from the phase diagram and measurements at the resulting crystals may be used.

In the method according to the second aspect of the invention it is likewise of advantage when the intermediate space in the container not occupied by the crystalline compound is kept as small as possible so that the quantities of the components necessary for forming the equilibrium concentrations in said space at the temperature of treatment are as small as possible. If required, said space may be further reduced by filling with an inert, preferably refractory, material in a porous form, for example, in the form of a powder. When only one of the compounds can substantially not produce a concentration in the intermediate space and as a result substantially no transfer of the said compound can take place through said space, the desired equilibrium will be obtainable yet by means of transfer of the other component or components. In addition it is possible, for example, to promote the transfer of a poorly vaporisable component by means of a chemical transport agent, that is to say, a substance which is vaporisable or gaseous at the temperature of treatment and which can enter into a reversible reaction with the said component while forming a volatile compound of the said component. The concentration ratio between the said substance and the said volatile compound in the equilibrium condition will in that case be determined by the composition of the crystalline compound with which this equilibrium is obtained for which, naturally, the content of the relative component in the crystalline compound is at least substantially decisive. As a result of the difference in composition between two crystals of the crystalline compound transport of the relative component through the intermediate space will take place in the form of the volatile compound of that component. Transport reactions for transporting solids in the form of a gas or a vapour are known *per se* but so far use has been made of temperature gradients in these reactions.

In order that the invention may readily be carried into effect, a few embodiments thereof will now be described in greater detail with reference to the accompanying drawing, in which FIG. 1 is a phase diagram of a two-components system in which the composition in atomic or molar ratios of the two components is plotted along the abscissa and the temperature is plotted on the ordinate.

Figure 1:
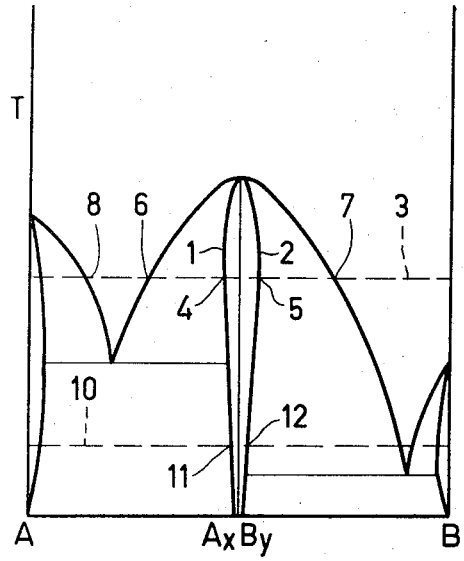
Figure 2:
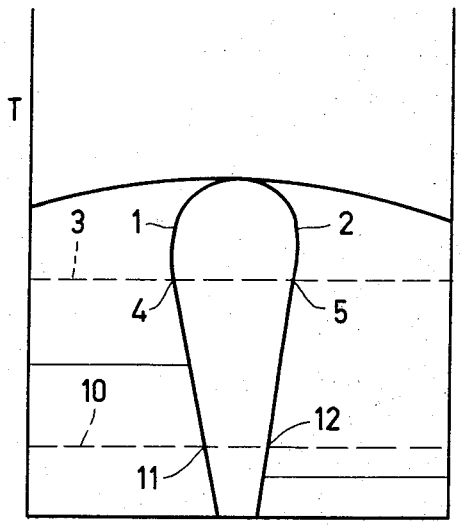
FIG. 2 shows part of the diagram of FIG. 1 in which the dimensions in the direction of the abscissa are enlarged.

FIG. 1 shows a phase diagram of a system of two components A and B between which only one crystalline compound $A_xB_y$ can be formed and in which $x$ and $y$ are integers. The compound $A_xB_y$ in the present case is a congruently melting substance and gives eutectic melting temperatures with A and B which can both melt normally. At each temperature the crystalline phase $A_xB_y$ has a thermodynamically stable range of existence within which the content of the components can vary. However, this range of existence can be very small and often is difficult to establish accurately. A possible form of the range of existence is shown in FIG. 2 in which part of the diagram of FIG. 1 is shown containing the atomic ratio $A_xB_y$, the dimensions on the abscissa being strongly enlarged. The marginal compositions of the compound $A_xB_y$, that is to say the most extreme compositions within which the compound is still stable in accordance with the temperature, are denoted by lines 1 and 2 (see FIG. 2). These compositions only can be in a thermodynamic equilibrium with other liquid or solid phases from the phase system of A and B.

Figure 3:
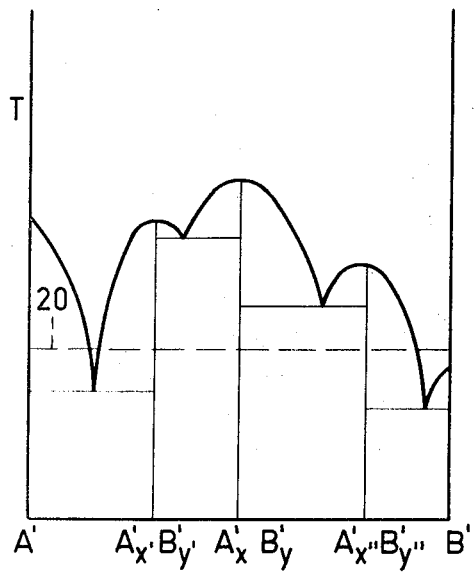
FIG. 3 shows a phase diagram of a two-components system of a different type in which composition and temperature are plotted in a manner corresponding to that of the diagram of FIG. 1.

FIG. 3 relates to a system of two components in which in addition to the crystalline phase $A_x'B_y'$ other crystalline phases occur, namely of the compound $A_{x'}'B_{y'}'$, with a higher content of the component A' and the compound $A_x'B_y'$ and of the compound $A'_{x''}B'_{y''}$ with a higher content of the component B' than the compound $A'_xB'_y$. Whereas in the phase diagram shown in FIG. 1 at the temperature 3 the compound $A_xB_y$ having the marginal composition 4 or 5 shown in FIG. 2 can be in equilibrium with a liquid of the composition 6 (see FIG. 1) with a higher content of the component A and with a liquid of the composition 7 with a higher content of the component B respectively, the compound $A'_xB'_y$ at the temperature 20 (see FIG. 3) can be in equilibrium with the crystalline compounds $A'_xB'_y$, or $A'_{x''}B'_{y''}$. The ranges of existence of the said three crystalline compounds are not shown in FIG. 3 but it must be assumed that all three compounds have a similar range of existence with marginal compositions within which variation of the content of the components is possible. At the temperature 20 in this case $A'_xB'_y$ phase with the marginal composition having the highest content of the component A' can be equilibrium with the $A'_xB'_y$ phase with the marginal composition having the highest content of the component B', or the $A'_xB'_y$ phase with the marginal composition having the highest content of the component B' can be in equilibrium with the $A'_{x''}B'_{y''}$ with the marginal composition having the highest content of the component A'.

Both for the compound $A_xB_y$ in the phase diagram of A and B at temperature 3 (see FIGS. 1 and 2) and for the compound $A'_xB'_y$ in the phase diagram of A' and B' at temperature 20 (see FIG. 3) it holds that the marginal composition of the relative compound with the highest content of one of the compounds can be in equilibrium with the subsequent phase (liquid or solid) with a higher content of this component namely with a marginal composition having the lowest content of the said component.

Figure 4:
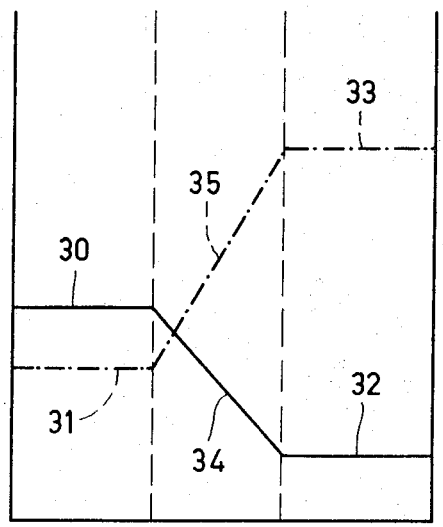
FIG. 4 shows a diagram in which the compositions shown in FIG. 2 are plotted on the abscissa and the associated concentrations of the components in the intermediate space are plotted on the ordinate.

When in addition to the said solid or liquid phases a gaseous phase is present built up only from vapour containing the components A and B and a given temperature is chosen, the content of each of the components in the gas phase in the equilibrium condition will be associated with the compositions of the solid or liquid phases present. If, for example, in the case of the phase diagram of A and B at temperature 3 (see FIGS. 1 and 2) a liquid phase and a vapour phase are present and if the composition of the liquid phase is made to vary from point 8 to point 6 in the phase diagram of FIG. 1, the vapour composition in the equilibrium condition will gradually vary, namely, the concentration of the component A will gradually decrease and the concentration of the component B will gradually increase until point 6 of the liquid composition is reached where the liquid has reached a marginal composition with maximum content of B. Addition of more B varies neither the composition of the liquid nor the vapour concentrations of the components but produces the solid compound $A_xB_y$ namely in a marginal composition 4 with a maximum content of the component A (see FIG. 2). The concentrations of the two components in the gaseous phase are not varied in this case. Vapour with these concentrations of the components A and B consequently can be in equilibrium both with a melt of the marginal composition 6 (see FIG. 1) and with solid $A_xB_y$ with a marginal composition 4 (see FIG. 2). FIG. 4 diagrammatically shows the concentrations, at temperature 3, in the gaseous phase of the components A (solid line) and B (dot-and-dash line) for the associated compositions of the solid and liquid phases in the same composition ratios as shown in FIG. 2. The horizontal parts 30 and 31 of the two lines in FIG. 4 indicate the concentrations of the relative components in the gaseous phase in equilibrium with liquid of the composition 6 (see FIG. 1) and/or solid substance in the $A_xB_y$ phase with the marginal composition 4 (see FIG. 2). The marginal composition of the solid $A_xB_y$ phase 5 with maximum B content can be in equilibrium with the marginal composition 7 of the liquid phase consisting of the component B with dissolved therein a maximum quantity of the component A. The associated vapour concentrations are shown in the horizontal parts 32 and 33 of the curves shown in FIG. 4. The concentration of A in the vapour is lower and that of B is higher than in the preceding case. The compositions of the compound $A_xB_y$ between the two said marginal compositions 4 and 5 cannot be in equilibrium with liquid phases at temperature 3, while the associated concentrations of the components in the gas phase proceeding from the marginal composition 4 to the marginal composition 5, vary gradually; in fact, the concentration of the component A in the gaseous phase will decrease and that of the component B will increase. In FIG. 4 the said curves in the relative central part are denoted by 34 and 35 straight lines, but in principle deviating shapes are possible, but without maxima or minima, that is to say, proceeding from left to right in FIG. 4 in the central part the curve 34 which indicates the concentrations of A in the gaseous phase will always descend and the curve 35 which indicates the concentrations of B in the gaseous phase will always ascend.

In the case of a crystal $A_xB_y$ of unknown composition and with inclusions the compositions of which are not known but which consist of one or more phases deviating from the phase $A_xB_y$, the following phenomena will occur when heating the said crystal at a temperature 3 in an evacuated space which also contains a mixture consisting of $A_xB_y$ with the nearest equilibrium phase with higher content of A. The two phases in the mixture will form an equilibrium in which the liquid phase will assume the marginal composition 6 (FIG. 1) and the solid $A_xB_y$ phase will assume the composition 4 (FIG. 2). In the evacuated space concentrations of the components A and B will adjust corresponding to the horizontal parts 30 and 31 of the curves in FIG. 4. In as far as the composition of the crystalline material in the crystal with $A_xB_y$ phase deviates from the marginal composition 4 the crystal will absorb the component A from the gaseous phase and supply the component B to the gaseous phase until a thermodynamic equilibrium is reached. Because also the concentrations of the components in the gaseous phase will always be reduced to the values indicated in FIG. 4 by 30 and 31 as a result of interaction of the vapour phase with the two-phase mixture, the crystal will vary its composition until it has obtained the marginal composition 4. An inclusion, if any, of a phase richer in B than the compound $A_xB_y$ will try to remain in equilibrium with adjacent crystal material of the phase $A_xB_y$ which is possible only when the latter material would assume the composition 5. Since, however, the composition of the crystal will be shifted in the direction of the composition 4 as a result of vaporisation of B and diffusion of A from the gaseous phase, the included phase which is rich in B will try to supply the component B to the surroundings and to absorb A which can occur only by conversion of the included phase into the $A_xB_y$ phase which is richer in A so that the inclusion disappears.

If, however, the crystal comprises inclusions which consist of a phase which is richer in A, this phase which is richer in A will vary the surrounding crystalline material in the $A_xB_y$ phase to the composition 4 (FIG. 2) by exchange of the components A and B, in which it itself obtains the composition 6 (FIG. 1). Since the whole crystalline material of the $A_xB_y$ phase obtains the composition 4 by interaction with the gaseous phase and through this phase with the mixture, the inclusion cannot disappear from the phase which is richer in A. When the crystal thus treated is then treated in a similar manner, this time with the use of a mixture consisting of the phase $A_xB_y$ and the nearest phase which is richer in B, the crystal will try to obtain the composition 5, in analogy with the above described phenomena, inclusions of a phase which is richer in A disappearing. The crystal thus treated now is homogeneous and has a composition corresponding to composition 5 shown in FIG. 2.

The two above treatments may also be carried out in a reversed sequence, in which the treated crystal likewise is free from inclusions but has obtained the composition 4.

From FIG. 2 it may be seen that crystals of the composition 4 or 5 in the curves 1 and 2, resp. shown in said figure which denote the marginal compositions of the compounds $A_xB_y$ in dependence of temperatures, are thermodynamically unstable at room temperature, denoted by 10, and can possibly be obtained in a frozen-up condition only by quenching.

Crystals which are free from inclusions with compositions between the two marginal compositions 4 and 5 can be obtained by heating a selected quantity of crystals of the marginal composition 4 together with a selected quantity of crystals with the marginal composition 5 in a closed space at a temperature 3—in which mutual transfer of the components A and B will occur through the vapour phase—until the two types have obtained the same composition and concentrations of the components are formed in the gaseous phase which are in equilibrium with the said composition. If in one or more of the crystals small quantities of inclusions of other phases should be present, these too will disappear during the treatment. By suitable choice of the quantities of the two marginal compositions a final composition can be obtained lying between the compositions 11 and 12 which is consequently stable at room temperature 10.

Figure 5:
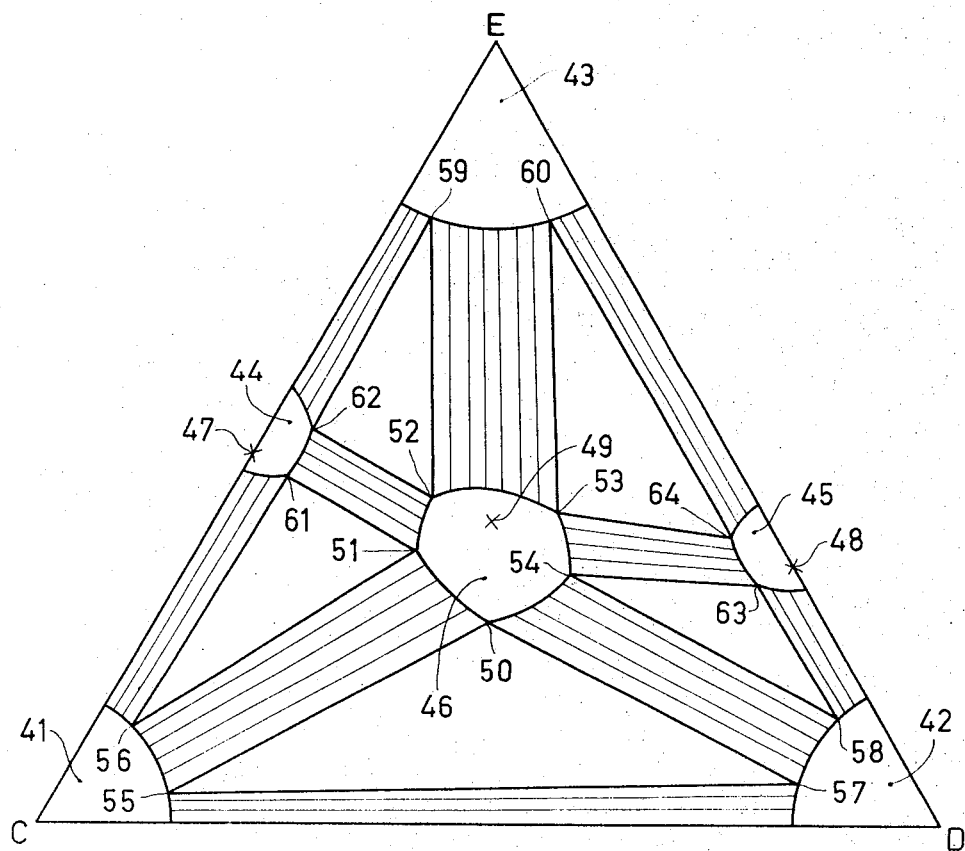
FIG. 5 shows a phase diagram of a three-components system at a given temperature.

FIG. 5 diagrammatically shows a system of three components at a given temperature in which six condensed phases can occur, namely three condensed phases 41, 42 and 43 of the components C, D and E respectively in which small quantities of the components may be dissolved, two condensed phases 44 and 45 of the compound $C_{x'}E_{z'}$ and $D_{y''}E_{z''}$ respectively and a crystalline phase 46 of the compound $C_xD_yE_z$, wherein $x$, $x'$, $y$, $y''$, $z$, $z'$ and $z''$ are integers. The stoichiometric compositions of the said compounds are denoted by 47, 48 and 49 respectively in FIG. 5.

The phase of the compound $C_xD_yE_z$, of which the stoichiometric composition in the phase diagram is denoted by 49, has a range of existence within the marginal compositions shown by means of the solid-line curve which connects the points 50, 51, 52, 53, 54 and 50. The marginal composition 50 may be in equilibrium with the condensed phase of C having the marginal composition 55 and with the condensed phase of D having the marginal composition 57. The marginal composition 54 of the crystalline $C_xD_yE_z$ phase can be in equilibrium with the condensed phase D having the marginal composition 58 and with the condensed phase of the compound $D_{y''}E_{z''}$ having the composition 63. The marginal compositions lying on the part of the closed curve between 50 and 54 can each be in equilibrium with a marginal composition of the condensed phase D lying on the curve between the points 57 and 58, the straight lines, drawn between the line section 50–51 at one end and the line section 57–58 at the other end, each denoting two possible marginal compositions which are in equilibrium with one another of the crystalline phase of the compound $C_xD_yE_z$ on the one hand and the condensed phase D on the other. The way of showing a three-components system at a given temperature is commonly used as such and the figure clearly shows, for each composition of the components C, D and E at the temperature to which the diagram relates, which condensed phase or phases can occur.

To obtain a crystal of the phase $C_xD_yE_z$, which is free from inclusions, such a crystal can first be heated, for example, at said given temperature in a closed container in the presence of a mixture of the condensed phases $C_xD_yE_z$, $C_{x'}E_{z'}$ and E which will assume marginal compositions denoted by the points 52, 62 and 59 respectively. In the intermediate gaseous phase the concentrations of the components C, D and E being in equilibrium therewith will be formed. By interaction of the treated crystal with the said gaseous phase the crystal, in as far as the crystalline $C_xD_yE_z$ phase is concerned, will assume the marginal composition 52 which is in equilibrium with the said gaseous phase. Included phases, if any, of C, D and $D_{y''}E_{z''}$ will disappear and only possibly included phases of $C_{x'}E_{z'}$, having the composition 62 and of E having the composition 59 will remain. In a corresponding subsequent treatment with a mixture consisting of the condensed phases $C_xD_yE_z$, $D_{y''}E_{z''}$ and E having marginal compositions 53, 64 and 60 respectively, the treated crystal will obtain the composition 53 while $C_{x'}E_{z'}$ possibly included will disappear and only inclusions consisting of the E phase can remain. In a subsequent treatment with a mixture consisting of phases $C_xD_yE_z$, C and D these latter inclusions will disappear entirely so that a crystal free from inclusions is obtained having the marginal composition 50.

It is clear that by suitable choice of other sequences of treatments and other mixtures likewise inclusion-free crystals $C_xD_yE_z$ can be obtained and the final composition in this case also is determined by the composition of the mixture during the last treatment.

The mixtures used may alternatively consist of two phases.

In addition it is possible to use a marginal composition of the compund $C_xD_yE_z$ instead of a mixture, in which the composition of the crystal after the treatment need not have obtained a marginal composition but a composition deviating therefrom to some extent. In such treatments also inclusions may disappear.

The system of three components at a given temperature with a compound consisting of three components diagrammatically shown in FIG. 5 is shown only as a system which is possible in principle. It is clear that quite a lot of types of systems of three components are possible in which in principle the methods according to the invention can be used.

In addition it is clear that starting from mixtures of various marginal compositions of the compound $C_xD_yE_z$ very many compositions can be obtained within the range of existence.

From the principles of performing the methods according to the invention described with reference to FIGS. 1 to 5 it is clear that the invention may in principle be used also with crystals of compounds consisting of more than three components.

In addition, instead of vacuum in the intermediate space an inert gas may be used or another inert medium, for example, an inert liquid. Alternatively, an inert gas or an inert liquid may be used which, at the temperature of treatment, is in a supercritical state. The term "inert" in this connection means that the medium does not enter into chemical reactions with the compound or components. However, at the temperature of treatment it may give other concentrations of the components in the intermediate space.

In addition, doping substances may be used to obtain doped physically pure crystals.

The invention will now be illustrated with reference to a few examples, the first of which illustrates a method according to the first aspect of the invention and the second illustrates a method according to the second aspect of the invention.

EXAMPLE I

Single crystals of zinc telluride (ZnTe) were prepared by sintering equivalent quantities of zinc and tellurium, after which single crystals were obtained from the resulting material by sublimation. The otherwise transparent crystals appeared to contain dark spots. The dimensions of the said spots were in the order of magnitude of 1 micron and were spaced on an average by approximately 50 microns. A crystal with dimensions of approximately 4 by 2 by 2 mm. was heated at 850° C. for one week in a closed evacuated quartz ampoul which further contained approximately 30 gms. of a powdered mixture consisting of zinc telluride and elementary tellurium, the atomic ratio of tellurium and zinc being approximately 2:1. In the crystal thus treated no decrease of the number of dark spots could be observed. The crystal was then treated in the same manner this time with the use of a powdered mixture of zinc telluride and zinc in an atomic ratio of tellurium and zinc of approximately 1:2. It was found that after this latter treatment the dark spots had disappeared out of the treated crystal. From this it may be concluded that the dark spots in the present case must be ascribed to inclusions consisting of tellurium.

In the present case the dark spots would probably have disappeared already in the first treatment with the mixture which is rich in zinc, and in this connection it is to be noted that in most crystalline compounds such inclusions cannot be observed without further means while in the present case it is difficult to predict the nature of the inclusions observed.

The above process was also carried out with the use in the first treatment of powdered zinc telluride with a marginal composition rich in tellurium without the second phase which was richer in tellurium and in the second treatment of powdered zinc telluride with a marginal composition rich in zinc without the second phase richer in zinc, after which the inclusions were found to have disappeared likewise in the crystal treated.

EXAMPLE II

This example relates to the treatment of the crystalline ferromagnetic compound manganese-antimonide (MnSb). From X-ray investigations it has been found that the range of existence of the said compound is wide and lies at 700° C. between approximately 45.8 and 49.2 atomic percent of Sb. For the first mentioned marginal composition a Curie temperature of approximately 440° K. and for the latter marginal composition a Curie temperature of approximately 590° K. was found. Powders of the above two compositions were prepared by heating mixtures of weighed-out proportions of manganese and antimony in the correct ratios at 700° C. and quenching after which the resulting crystals were pulverised. Crystals of unknown compositions with dimensions of approximately 4 by 2 by 1 mm. were then treated as follows.

A powdered mixture consisting of weighed-out proportions of the two above marginal compositions were provided in a quartz ampoul. On this powder a quartz glass boat was placed with the crystal to be treated after which the ampoul was evacuated and then sealed. The ampoul was then heated at 700° C. for two weeks and then quenched to room temperature.

A. A similar treatment was carried out with a powder mixture consisting of 3 parts by weight of manganese antimonide containing 45.8 atomic percent of Sb and 1 part by weight of manganese antimonide containing 49.2 atomic percent of antimony. After the treatment it was found that the Curie temperature of the crystal was approximately 490° K.

B. A similar treatment was carried out with a powder mixture consisting of equal parts by weight of powder of the two compositions mentioned sub A. The Curie temperature of the crystals after the treatment was found to be approximately 520° K.

C. A similar treatment was carried out with a powder mixture consisting of 1 part by weight of manganese antimonide containing 45.8 atomic percent of Sb and 3 parts by weight of manganese antimonide containing 49.2 atomic percent of Sb Curie temperature of the crystal after treatment was found to be approximately 545° K.

It is noted that after the above mentioned treatments the Curie temperature of the powders used was also measured for which substantially the same values were found as for the crystals treated with the said powders.

From this example it appears that the Curie temperature of the crystal treated gradually increases with increasing antimony content of the mixture used.

Similar treatments according to the second aspect of the invention of the ferromagnetic compound $Cr_3Te_4$ result in crystals having Curie temperatures gradually changing from about 70° C. to about −10° C. with compositions changing from 54, 65 to 58, 82 atomic percent Te.

It is noted that the second example relates to a crystalline compound which, as regards its composition, has a wide range of existence. In this case the two marginal compositions of the powders used in the mixture could be obtained with sufficient accuracy by simply weighing-in the starting components to obtain crystal compositions within the range of existence in the treatment. In general, however, more accurate results and, in the case of a narrow range of existence, more reliable results can be obtained by previously producing the marginal compositions with the use of the method according to the first aspect of the invention.

The two above examples are chosen for reason that the results of the methods according to the invention are clearly demonstrated, but it is clear that the invention is not restricted to the compounds mentioned in the said examples but may also be used, for other compounds for reasons of obvious equivalence based on single rules known or deducible from thermodynamics of systems of more than one compound with more than one phase, each heating process approaching equilibrium of the system to the invention may be important for those compounds having electrical, magnetical, optical or other physical properties varying with varying proportions of the components in the compound crystal, such as compounds of the type $A^{III}B^{V}$, in which $A^{III}$ may be one of the elements aluminium, gallium or indium and $B^{V}$ one of the elements phosphorous, arsenic or antimony, other compounds of the type $A^{II}B^{VI}$, in which $A^{II}$ may be one of the elements zinc, cadmium or mercury and $B^{VI}$ one of the elements sulphur, selenium or tellurium, such compounds as CrSb, FeSb, CoSb and NiSb and such compounds as SnS and SnSe, or compounds consisting of three components, for example, $CdIn_2S_4$ and $AgSbTe_2$, and other compounds.

What is claimed is:

1. A method for purification from inclusions of crystals of a compound of two components selected from the group consisting of IIA–VIB compounds and IIIA–VB compounds, which method comprises as a first step, heating in a closed container, at least one crystal substantially consisting of said compound and containing inclusions of an additional phase formed of one of said components together with a first mixture consisting essentially of said compound in the solid state as one phase and at least one other solid or liquid phase richer in a first one of said two components than said compound, the phases in said first mixture being in equilibrium with each other at the heating temperature employed during said first heating step, said heating temperature during said first step being sufficiently high to cause a vapor of said first component to form in said first mixture and diffuse said first component into said crystal to an extent dependent upon the composition of said additional phase, continuing said first heating step until the crystal and said first mixture reach equilibrium with each other, and thereafter for a second heating step heating the crystal treated during the first heating step in a closed container together with a second mixture consisting essentially of said compound in the solid state as one phase and at least one other solid or liquid phase richer in the second one of said two components than said first component, the phases in said second mixture being in equilibrium with each other at the heating temperature employed during the second heating step, the heating temperature during the second heating step being sufficiently high to cause a vapor of said second component to form in said second mixture and diffuse at least a portion of said second component from said second mixture into said treated crystal and continuing said second heating step until the treated crystal and the second mixture are at equilibrium with each other, in each case the mixture having no direct contact wtih the crystal but being sufficiently close to allow diffusion of vapors between the mixture and the crystal.

2. The method of claim 1 wherein the crystal is of a IIA–VIB compound.

3. The method of claim 1 wherein the crystal is of a IIIA–VB compound.

References Cited

UNITED STATES PATENTS

| | | | |
|---|---|---|---|
| 3,260,573 | 7/1966 | Ziegler | 23—273 SP |
| 3,316,062 | 4/1967 | Criscione et al. | 423—297 |

OSCAR R. VERTIZ, Primary Examiner

H. S. MILLER, Assistant Examiner

U.S. Cl. X.R.

423—299, 659; 75—62, 134 M